(12) United States Patent
Kogut et al.

(10) Patent No.: US 12,333,820 B2
(45) Date of Patent: Jun. 17, 2025

(54) MAPPING A VEHICLE ENVIRONMENT

(71) Applicant: Aptiv Technologies AG, Schaffhausen (CH)

(72) Inventors: Krzysztof Kogut, Cracow (PL); Jakub Porebski, Cracow (PL); Maciej Rózewicz, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 563 days.

(21) Appl. No.: 17/657,040

(22) Filed: Mar. 29, 2022

(65) Prior Publication Data

US 2022/0319188 A1   Oct. 6, 2022

(30) Foreign Application Priority Data

Apr. 1, 2021 (GB) ...................................... 2104760

(51) Int. Cl.
*G06V 20/00* (2022.01)
*B60W 30/095* (2012.01)
(Continued)

(52) U.S. Cl.
CPC ........... *G06V 20/58* (2022.01); *B60W 30/095* (2013.01); *G06F 18/24* (2023.01);
(Continued)

(58) Field of Classification Search
CPC ... G06V 20/58; G06V 10/764; B60W 30/095; B60W 2420/403; B60W 2554/4041;
(Continued)

(56) References Cited

U.S. PATENT DOCUMENTS

2018/0188059 A1   7/2018   Wheeler et al.
2019/0050653 A1   2/2019   Natroshvili et al.
(Continued)

FOREIGN PATENT DOCUMENTS

WO   2020053611   3/2020

OTHER PUBLICATIONS

"Extended European Search Report", EP Application No. 22164427.1, Aug. 10, 2022, 10 pages.
(Continued)

*Primary Examiner* — Xiao Liu
(74) *Attorney, Agent, or Firm* — Harness, Dickey & Pierce, P.L.C.

(57) ABSTRACT

A computer-implemented method and device for mapping a vehicle environment of a vehicle are disclosed. The method comprises determining an occupancy grid representing the vehicle environment, including occupancy probability information of a first set of object detections. The occupancy probability information is determined from first positioning information obtained from a first sensor system. Semantic information and second positioning information associated with the semantic information from one or more semantic information sources is obtained. The semantic information comprises object classification information of a second set of object detections and the second positioning system indicates one or more positions of the second set of object detections with respect to the vehicle. The object classification information of the second set of object detections is combined with the occupancy probability information of the occupancy grid to generate a classified occupancy grid.

17 Claims, 6 Drawing Sheets

(51) Int. Cl.
    *G06F 18/24* (2023.01)
    *G06V 20/58* (2022.01)
(52) U.S. Cl.
    CPC .......... *B60W 2420/403* (2013.01); *B60W 2554/4041* (2020.02); *B60W 2554/4049* (2020.02)
(58) Field of Classification Search
    CPC .......... B60W 2554/4049; G06F 18/24; G06F 18/00; G01S 7/4808; G01S 13/862; G01S 13/865; G01S 13/867; G01S 13/89; G01S 15/86; G01S 15/89; G01S 15/931; G01S 17/86; G01S 17/89; G01S 17/931; G01S 13/931; G01S 7/48; G01S 13/86; G05D 1/0274; G05D 1/02
    See application file for complete search history.

(56) References Cited

U.S. PATENT DOCUMENTS

| | | | |
|---|---|---|---|
| 2019/0387216 A1 | 12/2019 | Hicks | |
| 2020/0183011 A1* | 6/2020 | Lin | G01S 7/4808 |
| 2020/0250485 A1 | 8/2020 | Nagori et al. | |
| 2020/0324409 A1 | 10/2020 | Gonzalez Aguirre et al. | |
| 2021/0097638 A1* | 4/2021 | Vatavu | G05B 19/4155 |
| 2021/0334556 A1* | 10/2021 | Vignard | G06V 20/58 |

OTHER PUBLICATIONS

"Search Report", GB Application No. 2104760.0, Jan. 4, 2022, 4 pages.
Bieder, et al., "Exploiting Multi-Layer Grid Maps for Surround-View Semantic Segmentation of Sparse LiDAR Data", May 13, 2020, 7 pages.
Chen, et al., "SuMa++: Efficient LiDAR-based Semantic SLAM", May 24, 2021, 8 pages.
Erkent, "Semantic Grid Estimation with a Hybrid Bayesian and Deep Neural Network Approach", Sep. 25, 2018, 9 pages.
Guidolini, et al., "Removing Movable Objects from Grid Maps of Self-Driving Cars Using Deep Neural Networks", Jul. 2019, 8 pages.
Liu, "2D Semantic Mapping on Occupancy Grids", May 2012, 6 pages.
Sless, et al., "Road Scene Understanding by Occupancy Grid Learning from Sparse Radar Clusters using Semantic Segmentation", Sep. 2, 2019, 9 pages.
Thomas, et al., "Grid-based Online Road Model Estimation for Advanced Driver Assistance Systems", Jun. 2015, p. 71-76.
Thomas, "Online Road Model Generation From Evidential Semantic Grids", Sep. 2020, 8 pages.
Thomas, et al., "Semantic Grid-Based Road Model Estimation for Autonomous Driving", Jun. 2019, 8 pages.
Wirges, et al., "Object Detection and Classification in Occupancy Grid Maps using Deep Convolutional Networks", Dec. 5, 2018, 6 pages.
Yang, et al., "Semantic 3D Occupancy Mapping through Efficient High Order CRFs", Jul. 24, 2017, 8 pages.

* cited by examiner

MAPPING A VEHICLE ENVIRONMENT

CROSS-REFERENCE TO RELATED APPLICATION(S)

This application claims priority to Great Britain Patent Application Number 2104760.0, filed Apr. 1, 2021, the disclosure of which is hereby incorporated by reference in its entirety herein.

BACKGROUND

With the current development of motor vehicles that are fully autonomous and/or fitted with ADAS (Advanced Driver Assistance Systems), many techniques have been developed for the reliable estimation of the vehicle environment, on the basis of a large amount of data coming from one or more sensors of the vehicle. A widely used approach consists in detecting objects or obstacles in the environment of the vehicle, using one or more sensors, then in converting the raw data from the sensors into an occupancy grid containing cells associated with respective occupancy probabilities. The occupancy probability of each cell is calculated using a suitable sensor model, such as the Inverse Sensor Model, which converts the data relating to detected objects and additional information into occupancy probabilities.

Semantic information relating to classifications of objects in the vehicle environment may also be obtained. For example, cameras may obtain images of an area in front of the vehicle. The images thus obtained may then undergo segmentation analysis to determine a category for one or more objects in the field of view of the camera system. Information received from mapping applications may be also be incorporated to provide further semantic information. However, the positioning of such categorised objects with respect to the vehicle can have a high degree of uncertainty.

SUMMARY

The present disclosure relates to mapping the vehicle environment of a vehicle. A first aspect of the present disclosure provides a computer-implemented method for mapping a vehicle environment of a vehicle, the method comprising determining an occupancy grid representing the vehicle environment, the occupancy grid comprising occupancy probability information of a first set of object detections, wherein the occupancy probability information is determined from first positioning information obtained from a first sensor system, the first positioning information indicating one or more positions of the first set of object detections with respect to the vehicle; obtaining semantic information and second positioning information associated with the semantic information from one or more semantic information sources, the semantic information comprising object classification information of a second set of object detections, the second positioning system indicating one or more positions of the second set of object detections with respect to the vehicle; and combining the object classification information of the second set of object detections with the occupancy probability information of the occupancy grid to generate a classified occupancy grid.

The method may further comprise determining a semantic grid representing a vehicle environment using the semantic information and the second positioning information, the semantic grid comprising a grid of evidence values for one or more object classification types.

Determining a semantic grid may comprise projecting an object detection of the second set of object detections on to a grid representing the vehicle environment; determining an object spatial area for the object detection of the second set of object detections based on an uncertainty value of the second positioning information of the object detection; and assigning cells of one or more classification grids as being occupied by the object detection of the second set of object detections based on the object spatial area, each classification relating to a different classification type.

The method may further comprise calculating a confidence value for one or more cells of the semantic grid by applying a pignistic transformation to an evidence value of that cell; and combining the confidence value of one more cells of the semantic grid with an occupancy probability value of one or more corresponding cells of the occupancy grid.

Combining the confidence value of one or more cells of the semantic grid with an occupancy probability value of one or more corresponding cells of the occupancy grid may comprise multiplying the confidence value of the one more cells of the semantic grid with an occupancy probability value of one or more corresponding cells of the occupancy grid.

Combining the occupancy probability information with the semantic evidence information may comprise selecting an object detection of the second set of object detections having an object classification; identifying a provisional location of the object detection of the second set of object detections using the second positioning information; identifying an occupied region of the occupancy grid corresponding to an object detection of the first set of object detections as being proximate to the provisional location of the object detection of the second set of object detections; and assigning the object classification of the object detection of the second set of object detections to the occupied region of the occupancy grid corresponding to the object detection of the first set of object detections.

Identifying an occupied region of the occupancy grid may comprise comparing a distance between the provisional location of the object detection of the second set of object detections and the occupied region of the occupancy grid to a threshold distance; and assigning the object classification to the cells of the occupied region of the occupancy grid if the distance is less than or equal to the threshold distance.

Determining a semantic grid may comprise accumulating semantic evidence values in each cell of the semantic grid using an algorithm using the Dempster-Shafer framework.

The first sensor system may comprise an active positioning sensor system and the one or more semantic information sources may comprise a passive positioning sensor system.

The first sensor system may be a radar system, a lidar system, and/or an ultrasound system.

The one or more semantic information sources may comprise a camera system configured to capture one or more images of the vehicle environment and to extract the semantic information and the second positioning information from the one or more captured images.

A second aspect of the present disclosure provides a computer readable medium storing computer readable instructions that, when executed by a processor, cause the computer to perform the method of the first aspect.

A third aspect of the present disclosure provides a computing device comprising a memory and a controller, the controller configured to determine an occupancy grid representing the vehicle environment, the occupancy grid comprising occupancy probability information of a first set of object detections, wherein the occupancy probability information is determined from first positioning information obtained from a first sensor system, the first positioning information indicating one or more positions of the first set of object detections with respect to the vehicle; obtain semantic information from one or more semantic information sources, the semantic information comprising object classification information of a second set of object detections and second positioning information associated with the semantic information, the second positioning information obtained from a second sensor system, the second positioning system indicating one or more positions of the second set of object detections with respect to the vehicle; and combine the object classification information of the second set of object detections with the occupancy probability information of the occupancy grid to generate a classified occupancy grid.

BRIEF DESCRIPTION OF THE DRAWINGS

So that the present disclosure may be fully understood, example aspects will be described with reference to the accompanying drawings, in which.

DETAILED DESCRIPTION

Aspects of the disclosure described herein provide a method and device in which semantic information obtained from one or more semantic information sources may be combined with occupancy grids to obtain classified occupancy grids. Such classified occupancy grids indicate regions that are occupied by one or more objects that have been appropriately classified. As such, the high accuracy positioning of objects in the vehicle environment that is provided by occupancy grid information may be augmented using semantic information obtained from one or more semantic information sources.

The sensors used to obtain the information used to form the occupancy grid may be part of a lidar system, a radar system and/or an ultrasound system. Each of these systems is configured to provide a high degree of positioning accuracy. Data from each of these systems may be combined using an appropriate sensor fusion model. However, these systems do not, by themselves, provide a classification of the objects detected. Example object classifications include traffic signs, guardrails, other vehicles, lamp posts and so forth.

In examples described herein semantic information is obtained from a semantic sensor system. Semantic information includes object classification information, in other words information describing classifications of objects detected by the semantic sensor system.

In various embodiments, semantic sensor systems may include camera systems operable to capture images of a vehicle's environment. The captured images may undergo segmentation analysis to assign object classifications to objects detected in the captured images. Machine learning techniques provide allow objects to be identified with a high level of confidence.

Camera systems may also be used to determine positioning information of detected objects with respect to the vehicle. When used to estimate positioning information, camera systems may be termed passive positioning systems. This is in contrast to active positioning systems such as radar, lidar and/or ultrasound systems which rely on the principle of emitting signals and measuring scattered or reflected return signals. Passive positioning systems suffer the disadvantage that they are susceptible to deteriorating accuracy in poor environmental conditions such as darkness, fog, heavy rainfall and so forth.

Embodiments described herein provide for the combination of the object classifications determined by the semantic sensor systems, such as camera systems, with the high accuracy and reliability of active positioning systems such as radar, lidar and/or ultrasound systems.

Figure 1:
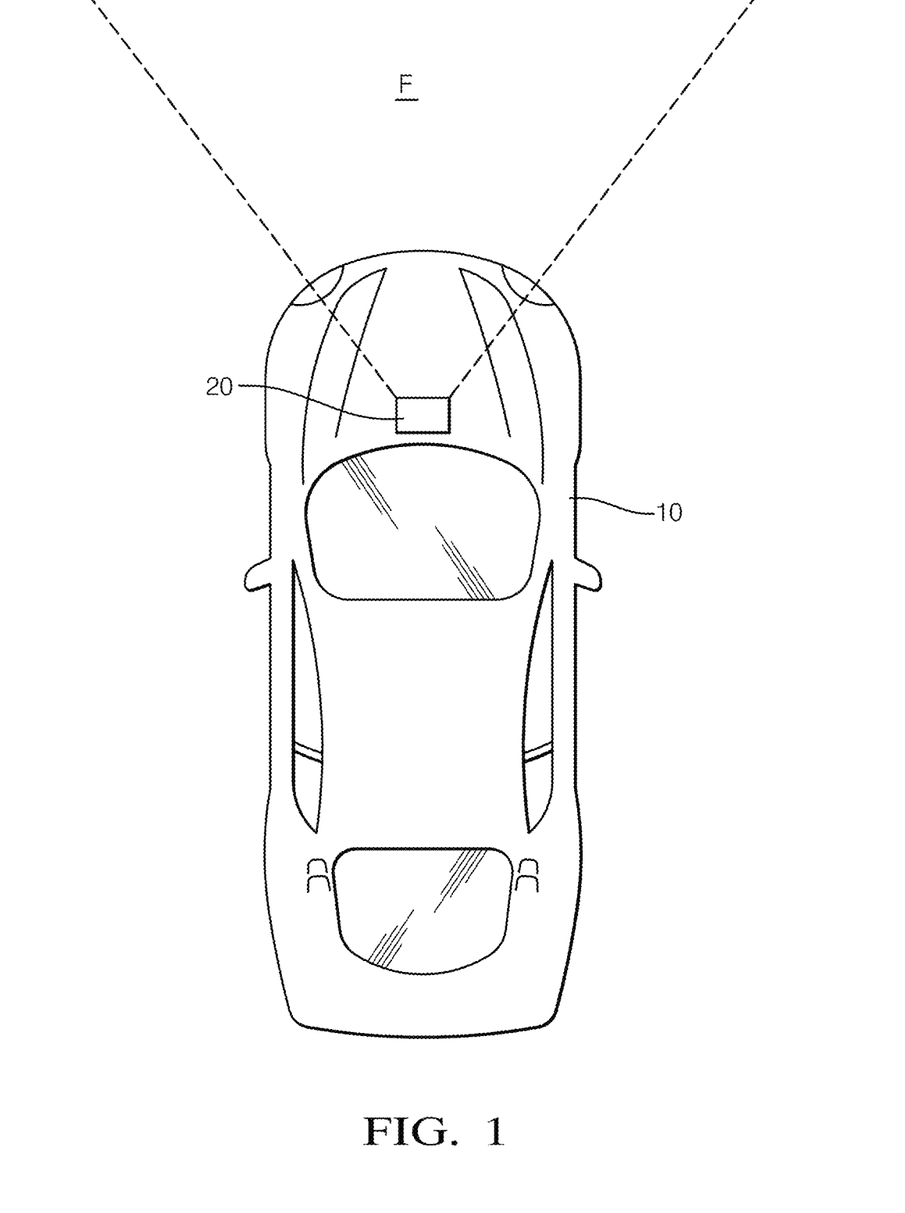
FIG. 1 is a representation of a vehicle in plane view.

FIG. 1 shows a vehicle 10 equipped with a device 20 for mapping the environment of the vehicle 10 according to one or more embodiments of the present disclosure. The device 20 may have various components mounted on the vehicle 10 at different locations, but for the sake of simplicity the device 20 is depicted as a single component mounted on the vehicle. The device 20 includes one or more sensors for sensing objects and/or free space in the surroundings of the vehicle 10. For example, the device 20 includes one or more radar sensors, lidar sensors, ultrasonic sensors and/or imaging sensors (such as a stereo-camera system or RGB camera) for detecting objects in the surroundings of the vehicle 10. The device 20 is an environment perception system configured to perform functions such as object tracking and free space estimation. Such an environment perception system may be configured to map the environment of the vehicle 10 according to the methods disclosed herein.

In the device 20, the sensors are mounted on the vehicle 10 such that they are able to sense objects within a field of view F of the vehicle surroundings, and in particular to sense the distance to objects in a plurality of directions from the vehicle 10 in the field of view. For example, sensors may be mounted at the front corners of the vehicle 10. The field of view is depicted as extending in the frontward direction of the vehicle 10, although the field of view could extend in any direction of the vehicle. Further, the field of view could be a partial view of the vehicle's 10 surroundings, or it could be an entire panoramic view of the surroundings. It will be appreciated that the number, position, and orientation of the sensors of the device 20 can be selected to achieve the desired field of view.

Figure 2:
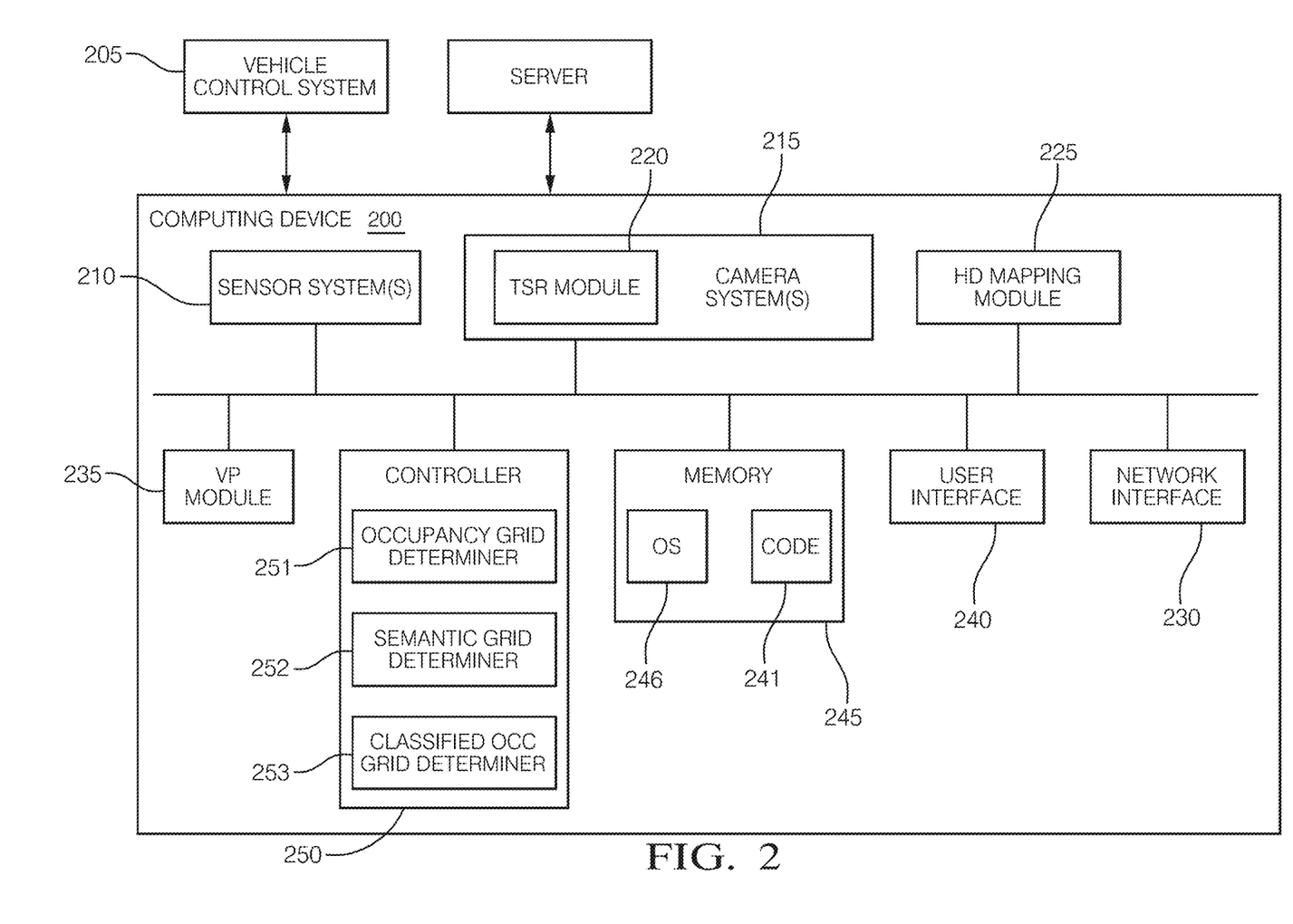
FIG. 2 is a schematic block diagram of a computing device in accordance with embodiments of the disclosure.

FIG. 2 is a schematic block diagram illustrating functionally components of a computing device 200 that is used in example embodiments of the present disclosure. The computing device 200 is an electronic device used to generate classified occupancy grids as described herein. The computing device 200 may be part of or in communication with an automated vehicle control system 205 responsible for controlling a fully or partially automated vehicle.

The computing device 200 includes a sensor system 210 which may include one or more of a radar system, a lidar system and/or an ultrasound system.

The sensor system 210 may be a radar sensor system including one or more radar antennas configured to emit radar signals, for example modulated radar signals, e.g. a Chirp-Signal. A signal may be acquired or detected at one or more antennas and is generally referred to as a return signal. The return signal(s) may result from a reflection of the emitted radar signal(s) on an obstacle. The one or more antennas may be provided individually or as an array of antennas, wherein at least one antenna of the one or more antennas emits the radar signal(s), and at least one antenna of the one or more antennas detects the return signal(s). The detected or acquired return signal(s) represents a variation of an amplitude/energy of an electromagnetic field over time.

Alternatively or additionally, the sensor system 210 may include one or more lidar or ultrasonic sensors, which are similarly configured to emit signals to the surroundings of the vehicle and to detect reflected signals from the surroundings of the vehicle and therefore detect objects in the surroundings. Since the sensor system 210 is used to determine occupancy grids, the sensor system 210 may be termed an occupancy sensor system.

The computing device includes a camera system 215. The camera system 215 may include an RGB camera configured to capture images of the vehicle surroundings. For example, the camera may be mounted on the vehicle and face forwards to capture images of the road and objects on the road and nearby, for example other vehicles, road signs, crash barriers, lamp posts and so forth. The camera system 215 may be used to extract semantic information from the captured images using a segmentation algorithm.

The camera system 215 may include a stereo camera system, from which the distance to an object within the field of view of the stereo camera can be determined via a stereo algorithm. Distance information obtained from the stereo camera system may be used, in combination with detection data obtained from the sensor system 210 to determine an occupancy grid.

Semantic information, as used herein, refers to information describing objects in the vehicle environment, for example object classifications. Example object classifications may include other vehicles, road signs, crash barriers, lamp posts and so forth. The semantic information may be obtained by analyzing images captured by the camera system 215, for example using a segmentation algorithm. Furthermore, semantic information may be obtained by comparing a vehicle position with map data.

The camera system 215 may include a traffic sign recognition (TSR) module 220. The TSR module 220 is configured to provide information about any detected traffic signs observed by cameras of the camera system 215 of the vehicle. Information from traffic signs may include speed limits, lane information, place names and any other information displayed on a traffic sign. The TSR module 220 may use any type of image recognition software known in the art and may incorporate various aspects of machine learning techniques such as the use of neural networks. As such, the information extracted by the TSR module from traffic signs is highly accurate. Additionally, the TSR module 220 may estimate a position of traffic signs by analyzing the images obtained by the camera system 215. However, the accuracy of sign position estimation using the TSR module 220 in combination with the camera system 215 may not be as accurate as object positioning using radar, lidar or ultrasound systems.

The computing device 200 includes a high definition (HD) mapping module 225. The HD mapping module 225 obtains HD map data mapping the vehicle environment. The HD map data may be obtained from a cloud server or from caches stored locally. The HD map data includes semantic information regarding objects in a particular area. For example, the locations of classified objects such as road signs, intersections, service stations and the like may be included in the HD map data. The HD map data may be stored locally in a map database. However, the HD mapping module 225 may access HD map data via a network interface 230 of the computing device 200 to access HD map data stored in a remote server 201.

The computing device 200 includes a vehicle positioning (VP) module 235. The vehicle positioning system 235 may use a global navigation satellite system (GNSS) such as global positioning system (GPS), Galileo, Glonass or the like. The vehicle positioning module 235 may combine information received from a GNSS with information obtained from an inertial navigation system (INS). As such, the vehicle positioning module 235 is configured to provide a real time indication of the vehicle's position. The vehicle's position may be used by the HD mapping module 225 to show the vehicle's position on an HD map.

While the HD map data is of a high accuracy, the vehicle positioning module 235 introduces a degree of uncertainty making it difficult to estimate the position of a classified object with respect to the vehicle. For example, non-military uses of global positioning systems tend to have an uncertainty of the order of 10 meters. Tall buildings, tunnels and cloudy weather can also degrade the positioning accuracy. Embodiments of the present disclosure allow for combining the semantic information derived from semantic sources such as HD maps with occupancy information derived from high positioning accuracy lidar, radar and/or ultrasound systems can help resolve the localization problems.

The computing device 200 may include a user interface 240. The user interface 240 may include a display for displaying information to a user. For example, the display may display real time positioning information to the user. The user interface may include an input device such as a keypad. Input and output means may be provided via a touchscreen interface. Furthermore, audio input/output may be provided via one or more microphones and speakers.

The computing device 200 includes a memory 245. The memory 245 may include volatile and non-volatile storage. The memory 245 may have an operating system 246 installed therein. The memory 245 may have computer-readable code stored therein, the execution of which may provide the functionality of aspects of the disclosure described herein. In addition to the memory 245, it should be appreciated that one or more of the other components of the computing device 200 may include dedicated memory resources.

The computing device 200 includes a controller 250. The controller 250 includes one or more processing elements for executing the computer readable code 247. The controller 250 includes an occupancy grid determiner 251, a semantic grid determiner 252 and a classified occupancy grid determiner 253. As will be explained, embodiments of the disclosure provide for the accumulation of occupancy data by the occupancy grid determiner 251, the accumulation of semantic data by the semantic grid determiner 252 and the combination of occupancy grid data with semantic data by the classified occupancy grid determiner 253.

Figure 3:
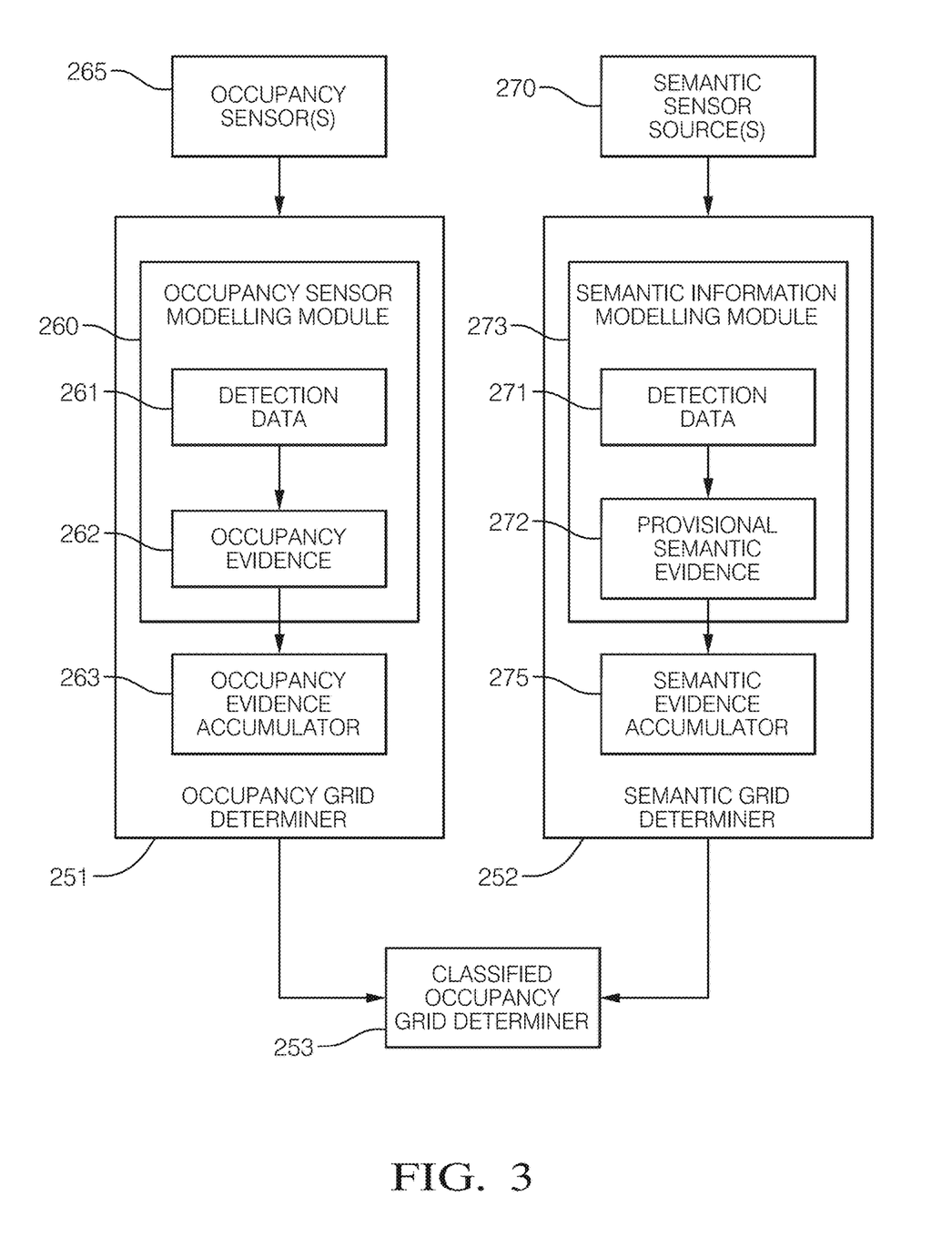
FIG. 3 is a schematic block diagram illustrating a workflow of components of a computing device in accordance with embodiments of the disclosure.

FIG. 3 is a schematic block diagram illustrating functional components of a computing device 200 in more detail.

The occupancy grid determiner 251 includes an occupancy sensor modelling module 260 configured to acquire detection data 261 (e.g. range and range rate data) from occupancy sensors 265 and compute the location of one or more objects in the vehicle's surroundings from the detection data 261. The occupancy sensors 265 may correspond to one or more sensors of the sensor system 210. An occupancy sensor modelling module 260 may be provided for each sensor system 210 supported by the mapping system. For example, an occupancy sensor modelling module 260 may be provided for the radar system, an occupancy sensor modelling module 260 may be provided for the lidar system and an occupancy sensor modelling module 260 may be provided for the ultrasound system so that detection data from respective sensor systems can be processed.

For embodiments including a radar, lidar or ultrasound sensor, the respective occupancy sensor modelling module 260 may acquire the return signal (e.g. detected at the one or more antennas) and may apply an analogue-to-digital (A/D) conversion thereto. The occupancy sensor modelling module 260 may convert a delay between emitting the signal(s) and detecting the return signal(s) into range data indicating the distance between an object and the vehicle, and the direction of the object is also calculated from the return signal(s) (e.g. from comparing multiple signals from different antennas). The delay, and thereby the range data, may be acquired by correlating the return signal(s) with the emitted radar signal(s).

The occupancy sensor modelling module 260 uses the detection data 261 to generate occupancy evidence 262 based on the detection data 261 obtained from the respective occupancy sensors 265 (for example, from one or more of a lidar, radar or ultrasound system). Occupancy evidence 262 may take the form of an occupancy grid having a grid of probability values illustrating areas in the vehicle environment occupied by one or more objects according to a particular sensor system 210. More specifically, the occupancy sensor modelling module 260 includes a sensor model which takes the acquired detection data 261 obtained from the occupancy sensors 265 as an input and generates an occupancy grid from the data (it will be appreciated that any sensor model may be used—for example any physical model, deterministic model or inverse sensor model). For example, the occupancy sensor modelling module 260 may receive a plurality of detections from the occupancy sensors 265 of a sensor system 210, each detection including a range value and an azimuth (indicating the distance and direction of the detected object or free space with respect to the vehicle). The detections may then be converted into a set of occupancy probabilities for cells in an occupancy grid. An occupancy grid may be obtained for each sensor system 210, for example a radar-based occupancy grid, a lidar-based occupancy grid and an ultrasound-based occupancy grid.

The occupancy evidence 262 of each sensor system 210 may then be provided to an occupancy evidence accumulator 263. The occupancy evidence accumulator 263 calculates an occupancy grid in the earth frame of reference based on the occupancy evidence 262 obtained from the occupancy sensors 265 of the various supported sensor systems 210. An accumulation algorithm may be applied to a radar-based occupancy grid, a lidar-based occupancy grid and an ultrasound-based occupancy grid. Furthermore, occupancy evidence 262 may be accumulated with historic occupancy data. Example accumulation algorithms include algorithms based on the Dempster-Shafer evidence theory, recursive Bayesian estimation, the central limit theorem or any other accumulation algorithm known in the art.

Figure 4A:
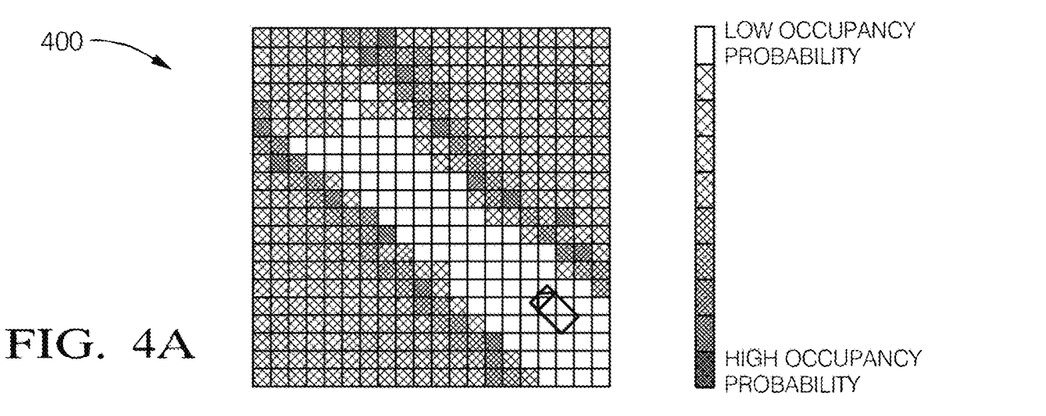
FIG. 4A is an illustration of an occupancy grid.

An exemplary occupancy grid 400 is shown in FIG. 4A. The occupancy grid 400 includes a grid of cells. The cell positions are defined using an occupancy grid coordinate system. The coordinate system may be a right-handed coordinate system, the origin being attached, for example at a corner of the grid. The coordinates of the bottom right cell are (0,0) with the coordinates of each neighbouring cell increasing by one in the direction of movement from the first cell. The occupancy grid may be defined in an earth frame of reference, a vehicle frame of reference or another frame of reference. For example, the occupancy grid may be generated in the vehicle frame of reference, and as such the coordinates of the occupancy grid each correspond to a fixed coordinate in the vehicle frame of reference. Each cell may take an occupancy value indicating whether that position is occupied by an object or not. For example, in the illustrated example, the black cells indicate that the cell is occupied by an object (and corresponds to the position where the sensors detect an object). On the other hand, the white cells indicate that the cell is not occupied by an object. Finally, the grey cells may indicate that there is no knowledge of the occupancy of that cell (for instance because another object lies in between than cell and the sensors, such that no signal reaches the position corresponding to that cell. The occupancy value for each cell is calculated from the detection data 261 obtained from the occupancy sensors 265 of each sensor system 210. For example, based on the range, azimuth and uncertainties of the detections, the occupancy evidence for each cell is calculated, which describes the probability that each cell is the origin of a detection (i.e. contains the location of the detection). The occupancy grid may be a Bayesian occupancy grid wherein the probability of the cell occupancy is calculated from evidence values obtained from the object and/or free space detections, although any type of occupancy grid may be used without departing from the present disclosure. For example, the occupancy probability of a cell may be given by $p(occ) = 0.5 + 0.5 \cdot p(c|d)$, where $p(c|d)$ is the occupancy evidence value of cell c given an object detection d. Equally, the free space probability may be given by $p(free) = 0.5 + 0.5 \cdot p(c|f)$, where $p(c|f)$ is the free space evidence value of cell c given a free space detection f. In some embodiments, the occupancy grid may include a grid of probabilities that each cell is occupied based on the P(occ) values and/or P(free) values. Each cell may then be assigned a probability value that the cell is occupied based on the object and/or free space detections. The occupancy grid may be rendered as, for example, a greyscale image or similar based on the probability value (0 being white/black, 1 being black/white). Each cell may instead be assigned as "occupied" if the occupancy probability is above an upper threshold, or "empty" if the occupancy probability is below a lower threshold. In some embodiments each grid cell may only be assigned "empty" or "occupied". In other embodiments a cell may further be assigned as "unknown" if the occupancy probability is between the upper and lower threshold when the thresholds differ. It will be appreciated that other methods may be used to generate the occupancy grid from the detection data 261.

Once the occupancy grid 400 has been generated by the occupancy grid determiner 251, the occupancy grid 400 is output to the classified occupancy grid determiner 253 so that occupancy data obtained therefrom may be combined with semantic evidence obtained from the semantic grid determiner 252.

Figure 5:
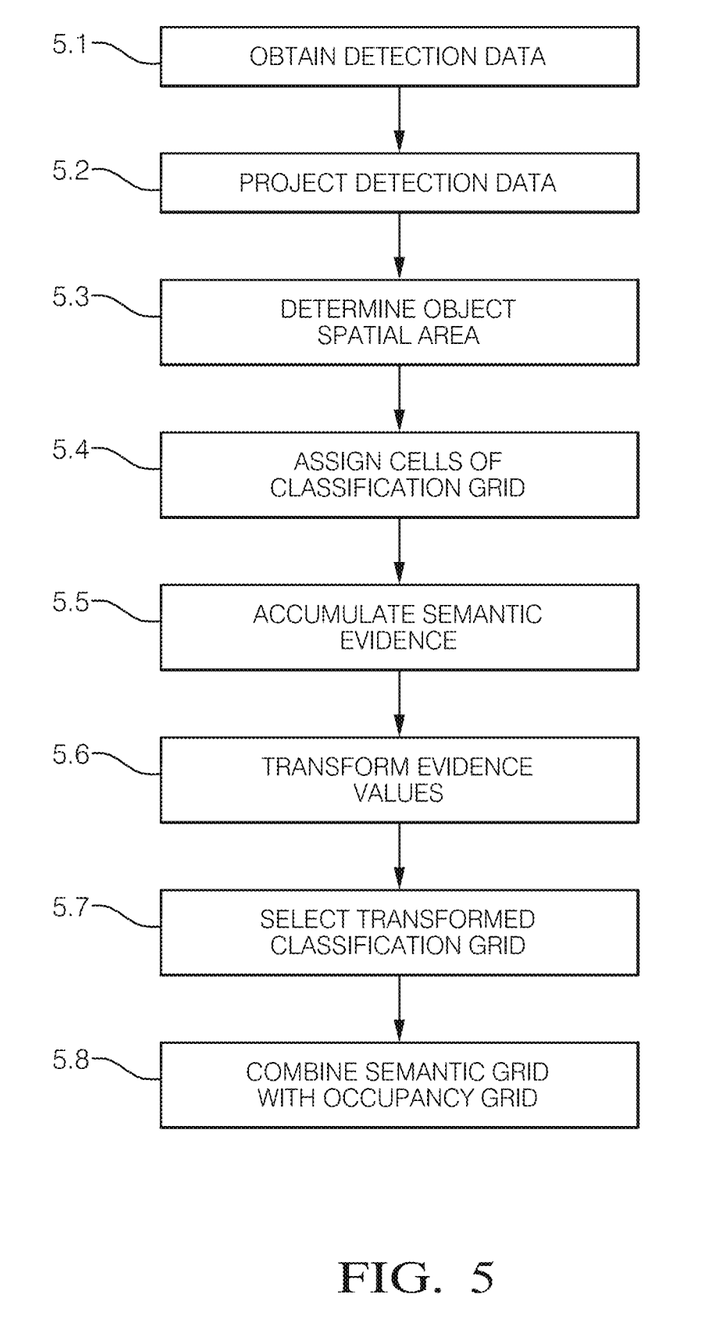
FIG. 5 is a flowchart illustrating operations performed by a computing device in accordance with embodiments of the disclosure.

FIG. 5 is a flow chart illustrating operations carried out to determine one or more semantic grids and to combine semantic information with an occupancy grid 400.

At step 5.1, one or more semantic sensor sources 270 provide detection data 271 to a semantic information modelling module 273 of the semantic grid determiner 252. The semantic sources 270 may include the camera system 215, which may include a TSR module 220.

Detection data 271 may be obtained by analysing image data obtained from the camera system 215. Detection data 271 relating to objects observed in camera images may be further analysed to provide positioning information of one or more object detections. Depth information may then be combined with azimuthal information of the camera to determine positioning information of the object detections with respect to the vehicle. The positioning information may be obtained by inferring depth information using deep learning techniques. However, such methods tend to be computationally expensive and/or provide sparse depth maps. Furthermore, such passive systems can yield unreliable information in poor environmental conditions such as darkness, fog, heavy rainfall and so forth.

Figure 4B:
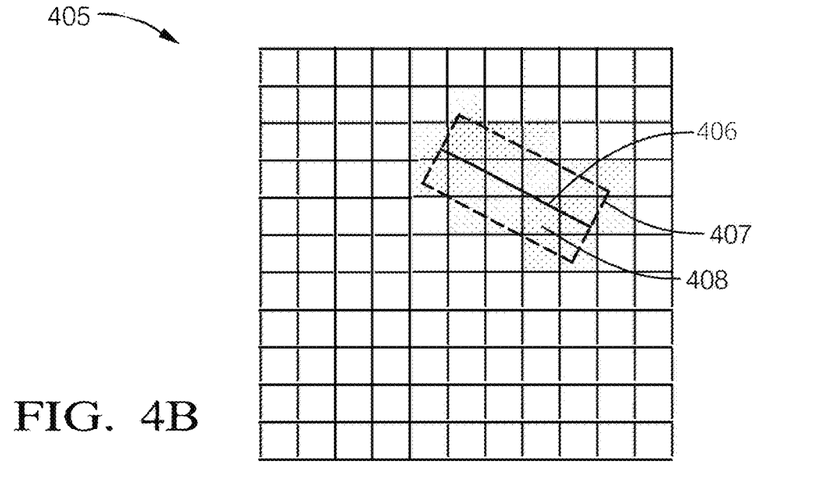
FIG. 4B is an illustration of a semantic grid.

At step 5.2, the detection data 271 may be projected on a grid providing a plan-view representation of the vehicle environment. Such a grid 405 is shown in FIG. 4B. In this example a detected planar object 406 is projected on to the grid 405.

After projecting the detected object 406 on to the grid 405, an uncertainty range may be applied to the positioning information, at step 5.3, in accordance with an appropriate uncertainty model. The level of uncertainty may be dependent on factors such as the camera resolution or the estimated distance of the detected object 406 from the camera. The level of uncertainty may vary linearly or exponentially with distance from the camera. Alternatively, a uniform uncertainty range may be applied. The uncertainty range may be represented as an object spatial area, such as the box 407 shown in FIG. 4B.

In addition to positioning information determined from the detection data 271, instantaneous evidence values may be determined that a particular object detection belongs to a particular object classification. Example classifications may include a guardrail, a signpost, a traffic cone, another vehicle, or any other object commonly encountered on a road.

At step 5.4, cells 408 of the grid 405 may be assigned as being occupied by an object of a particular object classification and assigned instantaneous evidence values for that classification. The cells may be selected by rasterizing the box 407. Provisional evidence values may then be assigned to the cells 408 of the grid 405. For example, a uniform evidence value may be applied to each of the cells 408. Alternatively, the provisional evidence value may depend on the distance from the sensor 270.

A separate grid 405 may be provided for each classification. Such a grid may be termed a classification grid. The classification grid may be thought of as a semantic grid for a particular classification type. For example, a classification grid may be provided for a signpost classification in which each cell 408 may be assigned a provisional evidence value between zero and 1 that that cell contains a signpost. A separate classification grid may be provided for a guardrail in which each cell may be assigned a provisional evidence value that that cell contains a guardrail. Further classification grids may be provided for different object classifications such as another vehicle, a lamp post, a pedestrian and so forth. Such provisional semantic evidence 272 is obtained by the semantic information modelling module 273.

Once one or more classification grids have been generated, the provisional evidence values may be output to a semantic evidence accumulator 275. Semantic evidence accumulation then occurs at step 5.5. Semantic evidence from different sensors may be fused using a fusion algorithm based on the Dempster-Shafer evidence model. Here, different sensors may be different camera sensors.

The Dempster-Shafer evidence model allows each classification grid to model different hypotheses. According to the Dempster-Shafer evidence model, the semantic classification space for a particular classification is represented as a set of independent masses representing degrees of belief, which is built to a frame of discernment:

$\Omega=\{$set of classes$\}$

Incoming new evidence may be fused into existing cell representation using Dempster-Shafer fusion rule ($m_{1 \oplus 2}$)

$$m_\cap(A) = (m_1 \cap m_2)(A) = \sum_{B \cap C = A} m_1(B) m_2(C) \qquad B, C \subseteq \Omega$$

$$m_{1 \oplus 2}(A) = m_1(A) \oplus m_2(A) \frac{m_\cap(A)}{1 - m_\cap(\emptyset)} \qquad A \subseteq \Omega$$

$$m_{1 \oplus 2}(\emptyset) = 0$$

In this example, the different classes A, B, C may be different classification types such as traffic signs, other vehicles, guard rails, lamp posts or the like. The indices 1, 2 of the masses may be mass values from different semantic sensor sources 270. Additionally, or alternatively, the different indices may indicate mass values varying over time. As such, the Dempster-Shafer framework allows semantic evidence values to be accumulated.

Each cell of the classification grid has multiple masses, one mass for the classification type of that classification grid and another mass for that classification considered in combination with each other possible classification type. By using combined masses from other classification types, it is possible to resolve potential conflicts in the cells. Various evidence fusion rules may be applied to resolve conflicts. The information from different classification types may be derived from the same sensor source 270 or from a different sensor source.

The grid thus obtained is an accumulated classification grid which yields belief values for each cell of the classification grid indicating a level of belief that that cell is occupied by an object of a particular classification type. A classification grid may be determined for each classification type of interest.

Accumulating evidence over time may also be performed. Temporal accumulation may be achieved using a temporal filtering algorithm based on the Dempster-Shafer Rule of Combination. Accumulating semantic evidence over time allows the provisional semantic evidence indicating that an object detection belongs to a particular object classification to be accumulated with historical semantic evidence for that classification.

A resultant classification grid may thereby be generated for each classification type.

At step 5.6, the evidence values of each accumulated classification grid may be transformed using a pignistic transformation to obtain a confidence level for each semantic evidence value of the classification grid for each classification type. The equation for the pignistic transformation is given below:

$$pig(A) = \sum_{B \subseteq \Omega} \frac{|A \cap B|}{|B|} \frac{m(A)}{1 - m(\emptyset)}, \quad B \subseteq \Omega$$

At step 5.7, the accumulated classification grid having the highest confidence levels may then be selected. For example, the classification grid having accumulated semantic evidence values for a traffic sign classification may be selected. The selected transformed classification grid may then be output to the classified occupancy grid determiner 253. The selected transformed classification grid may also be referred to as the semantic grid since it is the grid selected to provide semantic information to be combined with the occupancy grid 400.

At step 5.8, the classified occupancy grid determiner 253 combines information contained in the occupancy grid with information contained in the transformed semantic grid. The step of merging the information from the occupancy grid with information from the transformed semantic grid may be performed using the joint probability rule.

For any given cell, the semantic confidence value obtained from that cell of the transformed semantic grid and the occupancy probability obtained from that cell of the occupancy grid may be multiplied together. The result of this multiplication is a probability value of the cell being occupied and classified within a specific category.

$$p(A|occupancy)=p(occupancy) \cdot pig(A)$$

A classified occupancy grid is thus determined including an array of classified occupancy probability values.

Semantic information from other sources may also be incorporated into the classified occupancy grid. For example, HD map data including semantic data may be combined with the classified occupancy grid. This may be achieved by overlaying an HD map over the classified occupancy grid and fitting classified objects of the classified occupancy grid with classified objects in the HD maps.

Figure 4C:
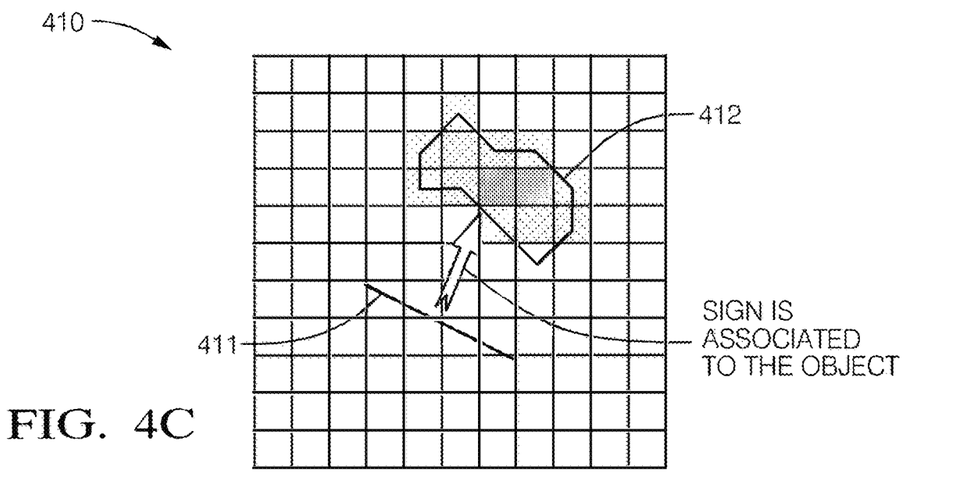
FIG. 4C is an illustration of a classified occupancy grid.

FIG. 4C shows a classified occupancy grid 410 in accordance with another example of the present disclosure. In this example, one or more of the semantic sensor sources 270 report the presence of an object 411 in the vehicle environment. The likelihood of the object being of various possible classifications may be determined and compared. The object classifications having the highest likelihood may be selected. For example, a camera, using machine learning determines that a traffic sign is present and a TSR module extracts information from the sign.

In this example, an occupancy grid generated using a radar, lidar and/or ultrasound system is generated in the manner described above. The occupancy grid thus obtained may then be transformed into a list of objects using a segmentation algorithm such as a clustering algorithm, Density-Based Spatial Clustering of Applications with Noise (DBSCAN), K-Means, Expectation-Maximization using Gaussian Mixture Models (GMM) or any other suitable algorithm known in the art. The objects in the occupancy grid may be listed as contours, clusters, or bounding boxes.

The reported semantic object (in this example the traffic sign 411) may then be associated with a corresponding occupancy object 412. The association of the reported semantic object and the occupancy object may be performed by measuring the distance between the semantic object and the occupancy object and comparing the measured distance to a threshold. If the measured distance is less than or equal to the threshold distance, then the reported object may be associated with the occupancy object. Additionally, or alternatively, shape metrics of the occupancy objects may be measured and compared to the shape of the reported object for example using a machine learning algorithm. For example, since traffic signs are substantially planar in shape, a match may be determined with an occupancy object having an elongate shape. The semantic information for the reported object may then be assigned to the occupancy object 412.

Figure 6:
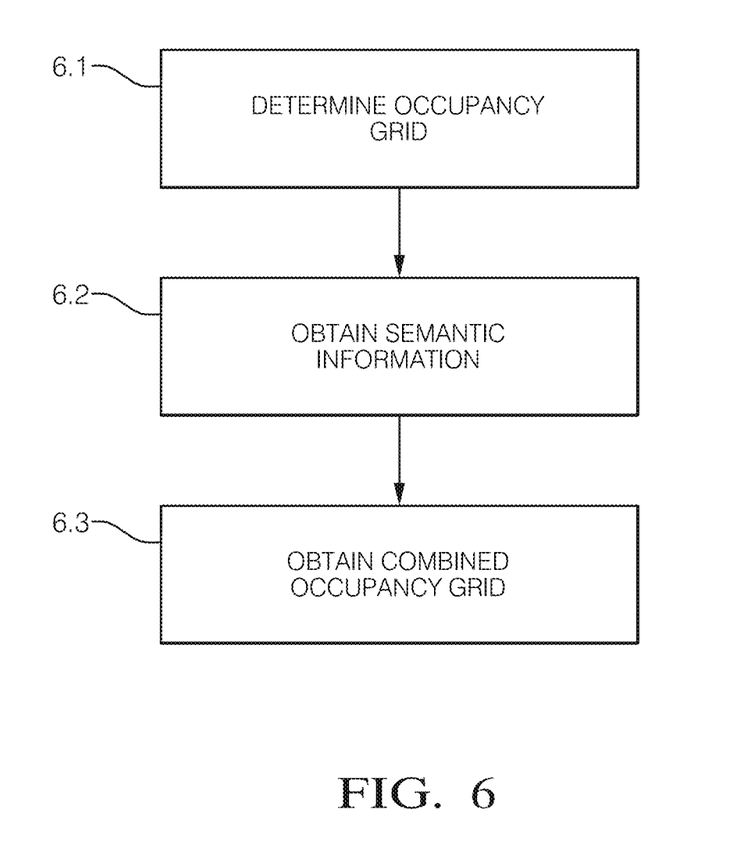
FIG. 6 is a flowchart illustrating operations performed by a computing device in accordance with embodiments of the disclosure.

FIG. 6 is a flowchart illustrating example operations carried out by the computing device 200. While the steps shown in FIG. 5 are shown in an exemplary sequential order, it should be understood that one or more of the steps may be performed in parallel by separate processor cores.

At step 6.1, an occupancy grid is determined representing a vehicle environment. The occupancy grid includes occupancy probability values determined from a set of object detections. The occupancy information is determined from positioning information obtained from a first sensor system such as a radar, lidar and/or ultrasound system. The positioning information indicates one or more positions of the first set of object detections with respect to the vehicle.

At step 6.2, semantic information is obtained from one or more semantic information sources. The semantic information sources may be one or more sensor systems such as a camera system. The semantic information includes object classification information of a set of object detections and positioning information indicating one or more positions of the set of object detections with respect to the vehicle. The positioning information obtained from the sources of semantic information generally has a lower accuracy than the positioning information obtained by the sensors used to generate the occupancy grid.

At step 6.3, the object classification information of the second set of object detections is combined with the occupancy probability information of the occupancy grid to generate a classified occupancy grid. This can be performed by generating a semantic grid including semantic evidence values based on the positioning information obtained from the sources of semantic information. The semantic grid may be formed by accumulating semantic information from multiple semantic sensor sources. More than one semantic grid may be generated, each semantic grid focused on a particular classification type. The semantic grid for a particular classification type may include a grid of evidence values generated using evidence values of other classification types to resolve potential conflicts.

The resulting combined occupancy grid therefore has an improved positioning accuracy of object detections compared with the semantic grid alone. Furthermore, the occupancy grid is improved by adding object classifications obtained from the one or more sensor sources.

It should be understood that the approach described herein provides several improvements over existing systems of object classification. A classified occupancy grid is provided combining information derived from other semantic sources. The steps of obtaining a semantic grid and combining the semantic grid with the occupancy grid can be largely independent of the occupancy grid processing algorithm. As such, the semantic layer may be easily applied on top of different occupancy grids with different sensor sets.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized in ways other than those shown in the accompanying figures.

Software embodiments of the examples presented herein may be provided as, a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects of the disclosure, as described above.

Included in the programming and/or software of the system are software modules for implementing the procedures described herein. In some example embodiments herein, a module includes software, although in other example embodiments herein, a module includes hardware, or a combination of hardware and software.

While various example embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements, and features discussed only in connection with one embodiment are not intended to be excluded from a similar role in other embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

What is claimed is:

1. A method comprising:
   determining an occupancy grid representing a vehicle environment, the occupancy grid comprising occupancy probability information of a first set of object detections, the occupancy probability information determined from first positioning information obtained from a first sensor system, the first positioning information indicating one or more positions of the first set of object detections with respect to a vehicle;
   obtaining semantic information and second positioning information associated with the semantic information from one or more semantic information sources, the semantic information comprising object classification information of a second set of object detections, the second positioning system indicating one or more positions of the second set of object detections with respect to the vehicle;
   determining a semantic grid representing a vehicle environment using the semantic information and the second positioning information, the semantic grid comprising a grid of evidence values for one or more object classification types; and
   combining the object classification information of the semantic grid with the occupancy probability information of the occupancy grid to generate a classified occupancy grid.

2. The method of claim 1, wherein determining the semantic grid comprises:
   projecting an object detection of the second set of object detections on to a grid representing the vehicle environment;
   determining an object spatial area for the object detection of the second set of object detections based on an uncertainty value of the second positioning information of the object detection; and
   assigning cells of one or more classification grids as being occupied by the object detection of the second set of object detections based on the object spatial area, each classification relating to a different classification type.

3. The method of claim 1, further comprising:
   calculating a confidence value for one or more cells of the semantic grid by applying a pignistic transformation to an evidence value of that cell; and
   combining the confidence value of one more cells of the semantic grid with an occupancy probability value of one or more corresponding cells of the occupancy grid.

4. The method of claim 3, wherein combining the confidence value of one or more cells of the semantic grid with an occupancy probability value of one or more corresponding cells of the occupancy grid comprises multiplying the confidence value of the one more cells of the semantic grid with an occupancy probability value of one or more corresponding cells of the occupancy grid.

5. The method of claim 1, wherein combining the object classification information of the semantic grid with the occupancy probability information of the occupancy grid comprises:
   selecting an object detection of the second set of object detections having an object classification;
   identifying a provisional location of the object detection of the second set of object detections using the second positioning information;
   identifying an occupied region of the occupancy grid corresponding to an object detection of the first set of object detections as being proximate to the provisional location of the object detection of the second set of object detections; and
   assigning the object classification of the object detection of the second set of object detections to the occupied region of the occupancy grid corresponding to the object detection of the first set of object detections.

6. The method of claim 5, wherein identifying an occupied region of the occupancy grid comprises:
   comparing a distance between the provisional location of the object detection of the second set of object detections and the occupied region of the occupancy grid to a threshold distance; and
   assigning the object classification to the cells of the occupied region of the occupancy grid if the distance is less than or equal to the threshold distance.

7. The method of claim 1, wherein determining a semantic grid comprises accumulating semantic evidence values in each cell of the semantic grid using an algorithm using the Dempster-Shafer framework.

8. The method of claim 1, wherein the one or more semantic information sources comprises a camera system configured to capture one or more images of the vehicle environment and to extract the semantic information and the second positioning information from the one or more captured images.

9. A non-transitory computer-readable storage medium storing computer-readable instructions that, when executed by at least one processor, configure the at least one processor to:
   determine an occupancy grid representing a vehicle environment, the occupancy grid comprising occupancy probability information of a first set of object detections, the occupancy probability information determined from first positioning information obtained from a first sensor system, the first positioning information indicating one or more positions of the first set of object detections with respect to a vehicle;
   obtain semantic information and second positioning information associated with the semantic information from one or more semantic information sources, the semantic information comprising object classification information of a second set of object detections, the second positioning system indicating one or more positions of the second set of object detections with respect to the vehicle;
   determine a semantic grid representing a vehicle environment using the semantic information and the second positioning information, the semantic grid comprising a grid of evidence values for one or more object classification types; and
   combine the object classification information of the second set of object detections with the occupancy probability information of the occupancy grid to generate a classified occupancy grid.

10. The non-transitory computer-readable storage medium of claim 9, wherein, to determine the semantic grid, the at least one processor is configured to:
   project an object detection of the second set of object detections on to a grid representing the vehicle environment;
   determine an object spatial area for the object detection of the second set of object detections based on an uncertainty value of the second positioning information of the object detection; and
   assign cells of one or more classification grids as being occupied by the object detection of the second set of object detections based on the object spatial area, each classification relating to a different classification type.

11. A computing device comprising:

a first sensor system;

at least one processor; and a computer-readable storage medium storing computer-readable instructions that, when executed by the at least one processor, configure the at least one processor to:

determine an occupancy grid representing a vehicle environment, the occupancy grid comprising occupancy probability information of a first set of object detections, the occupancy probability information determined from first positioning information obtained from the first sensor system, the first positioning information indicating one or more positions of the first set of object detections with respect to a vehicle;

obtain semantic information and second positioning information associated with the semantic information from one or more semantic information sources, the semantic information comprising object classification information of a second set of object detections, the second positioning system indicating one or more positions of the second set of object detections with respect to the vehicle;

determine a semantic grid representing a vehicle environment using the semantic information and the second positioning information, the semantic grid comprising a grid of evidence values for one or more object classification types; and combine the object classification information of the second set of object detections with the occupancy probability information of the occupancy grid to generate a classified occupancy grid.

12. The computing device of claim 11, wherein, to determine the semantic grid, the processor is configured to:

project an object detection of the second set of object detections on to a grid representing the vehicle environment;

determine an object spatial area for the object detection of the second set of object detections based on an uncertainty value of the second positioning information of the object detection; and assign cells of one or more classification grids as being occupied by the object detection of the second set of object detections based on the object spatial area, each classification relating to a different classification type.

13. The computing device of claim 11, wherein the at least one processor is further configured to:

calculate a confidence value for one or more cells of the semantic grid by applying a pignistic transformation to an evidence value of that cell; and combine the confidence value of one more cells of the semantic grid with an occupancy probability value of one or more corresponding cells of the occupancy grid.

14. The computing device of claim 13, wherein, to combine the confidence value of the one or more cells of the semantic grid with the occupancy probability value of the one or more corresponding cells of the occupancy grid, the at least one processor is configured to multiply the confidence value of the one more cells of the semantic grid with an occupancy probability value of one or more corresponding cells of the occupancy grid.

15. The computing device of claim 11, wherein the first sensor system comprises an active positioning sensor system and the one or more semantic information sources comprises a passive positioning sensor system.

16. The computing device of claim 11, wherein the first sensor system is a radar system, a lidar system, and/or an ultrasound system.

17. The computing device of claim 11, wherein the computing device comprises the vehicle.

* * * * *